Jan. 23, 1968 R. A. COCHRANE 3,365,030
PIVOTED, CLOSED LOOP TYPE DISC BRAKE
Filed May 31, 1966 3 Sheets-Sheet 1

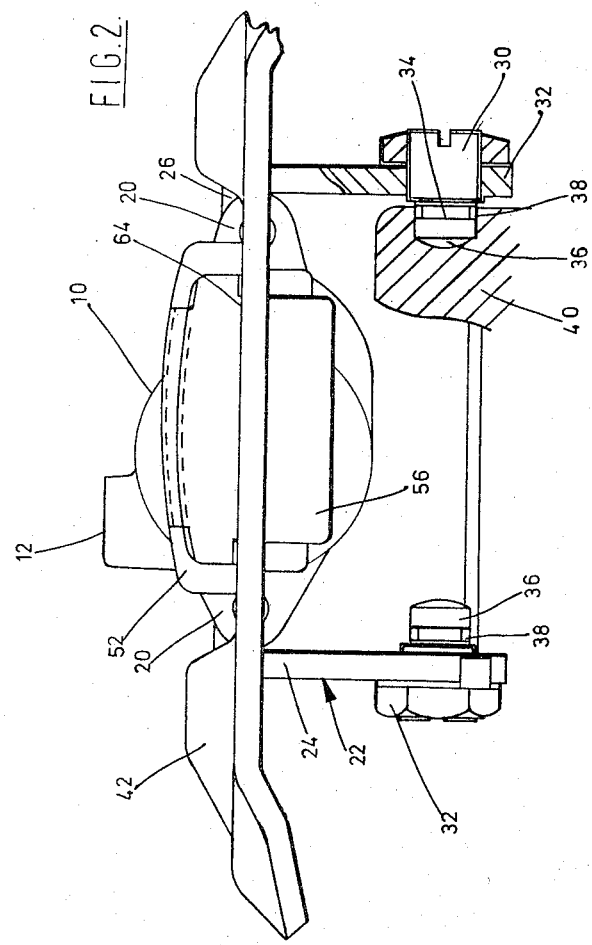

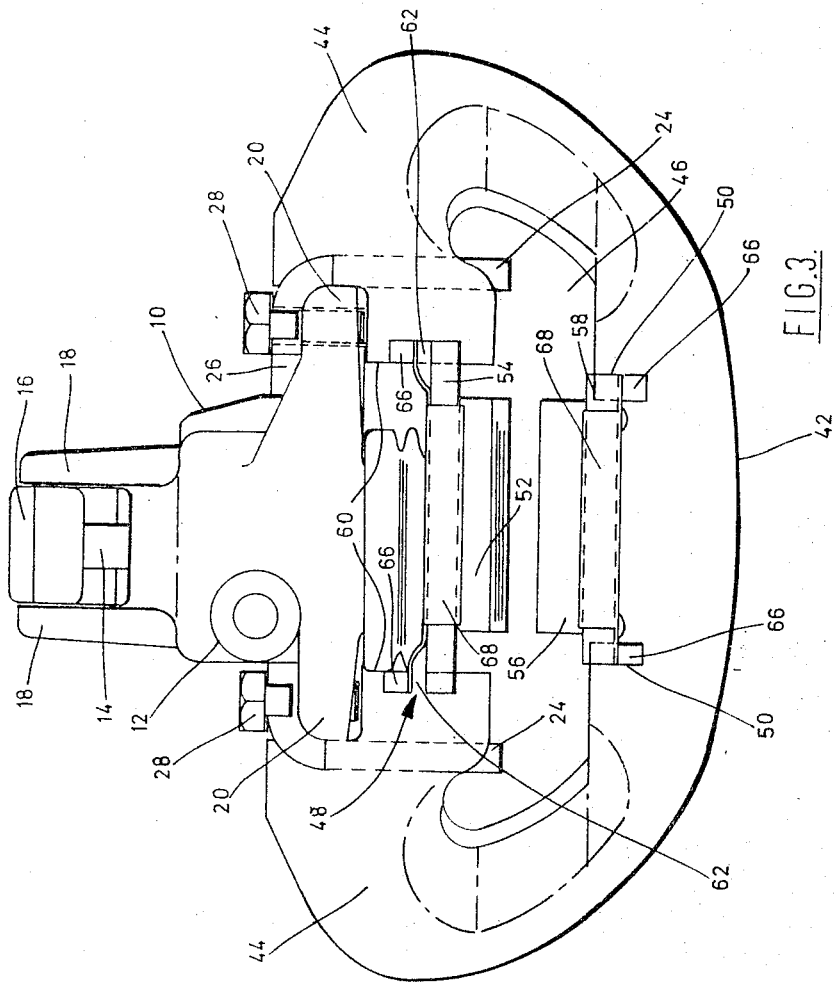

United States Patent Office 3,365,030
Patented Jan. 23, 1968

3,365,030
PIVOTED, CLOSED LOOP TYPE DISC BRAKE
Robin A. Cochrane, Glewstone, Ross-on-Wye, England, assignor to Girling Limited, Tyseley, Birmingham, England
Filed May 31, 1966, Ser. No. 554,052
Claims priority, application Great Britain, June 9, 1965, 24,332/65
12 Claims. (Cl. 188—73)

ABSTRACT OF THE DISCLOSURE

A caliper for a swinging caliper disc brake which is formed from a U-shaped pivot member and a C-shaped yoke member which are secured together to form a closed hoop for chordally circumscribing the disc. The two opposite inner ends of the arms of the C-shaped yoke provide two parallel guides between which the directly actuated friction pad member moves and the indirectly operated friction pad is carried opposite the directly operated pad, on the rear wall of the C-shaped yoke. The caliper can be pivotally mounted about an axis parallel to the plane of the disc by means of pivoting lugs carried by the two arms of the U-shaped member and the yoke is deformed in the region of its two arms at the ends of the aperture defined by the yoke and U-shaped member so that the shape of the yoke conforms with the outline of the disc. A power driven actuator for actuating the directly actuated friction pad assembly, is contained within a cast housing which is carried by the U-shaped member.

This invention concerns disc brakes and relates more particularly to a so-called swinging caliper for a disc brake.

In one popular form of disc brake a pair of friction elements each comprising a pad of friction material carried on a rigid backplate are mounted in a housing or caliper for movement respectively towards opposite sides of a brake disc, but provision is made for power displacing only one of the friction elements towards the disc, the caliper being pivotally secured to a fixed part, for example of a vehicle, so that the other friction element is forced against the disc by a swinging movement of the caliper set up by reaction. However, as a result of its need to be pivotally mounted and to provide a means for receiving the friction elements together with some form of power driven actuator for displacing the directly operated friction element, the caliper is usually of a rather complicated configuration and, generally being of cast metal, is relatively difficult and expensive to fabricate.

According to the present invention, a disc brake swinging caliper comprises a body member for the power driven actuator a separate pivot member secured to the body member for enabling the same to be pivotally mounted and a separate, centrally apertured yoke carried by the resulting pivotal assembly for chordally circumscribing a brake disc and providing a mounting for a pair of friction elements respectively adapted to be displaced into engagement with opposite sides of the disc responsive to operation of said actuator. Preferably the body member is a casting while the pivot member and the yoke are metal pressings, of which the pivot member may conveniently be bolted to the body casting and be formed with seating surfaces to which the yoke is welded.

The invention will be described further, by way of example, with reference to the accompanying drawings in which:

FIG. 2 is a rear elevation thereof,

FIG. 3 is a plan view, and

Figure 1:
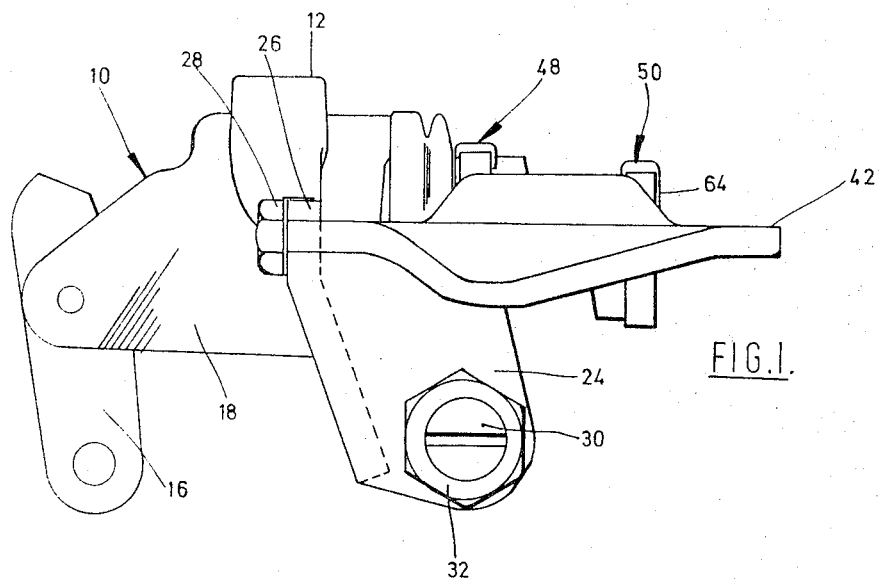
FIG. 1 is a side elevation of a disc brake caliper embodying the invention.
Figure 4:
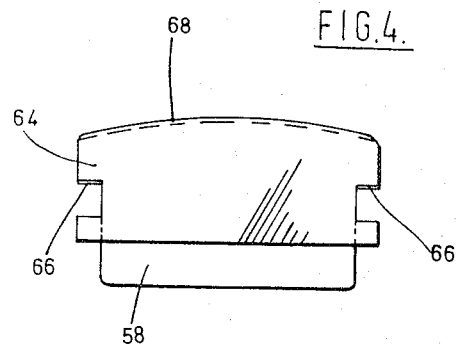
FIG. 4 is a detail of the indirectly operated friction pad.

The disc brake caliper shown in the drawings comprises a body member generally designated 10 and taking the form of a metal casting which is internally provided with a hydraulic cylinder (not shown) communicating with a pressure fluid inlet 12. Within the cylinder is arranged a piston (not shown) which is adapted to be displaced along the cylinder responsive to the admission of pressure fluid thereto. The piston is also adapted for displacement mechanically by means of a strut 14 which extends out of the cylinder at one end of the body member 10 and there coacts with a lever 16 pivotally mounted between spaced arms 18 integral with and projecting axially from the body member.

At its opposite end, the body member 10 is provided with a pair of opposed, laterally directed lugs 20 which are machined with threaded bolt holes for securing it to a generally U-shaped mounting bracket 22 constituting a pivot member. The bracket 22 has limbs 24 and a crown portion 26, the latter having its upper edge recessed to receive the body member 10 and apertured on each side of the recess to accept bolts 28 by which the body member and mounting bracket are secured together. The bracket 22 is a steel pressing and at the free ends of its limbs 24 is apertured to receive pivot pins 30 which are secured to the limbs by nuts 32. Beyond the limb 24, each pivot pin 30 has reduced diameter portion 34 extending laterally inwardly to terminate in a part spherical end 36 which is received in a hole 38 in a post 40 carried by a fixed part of a vehicle. If desired, of course, the pivot pins may alternatively have spherical heads instead of the part-spherical ends 36, thus enabling the caliper to be swivel mounted to give it a limited freedom of movement in a number of directions.

The upper edge of each of the limbs 24 of the mounting bracket 22 is formed with or as a flat surface constituting a seat for inner end regions of the arms 44 of a generally C-shaped yoke 42 which defines a central aperture 46 for chordally embracing a portion of a brake disc (not shown). The yoke 42 is also a metal pressing and as most clearly seen in FIG. 2 is deformed in the region of each arm 44 to conform with the outline of the disc and thus save installation space. The yoke is secured to the bracket 22 by welding its arms to the seating surfaces provided on the bracket limbs 24.

The yoke 42 provides a mounting for a pair of friction elements 48 and 50 and respectively comprises a friction pad 52 carried on a backplate 54 and a friction pad 56 carried on a backplate 58. The directly operated friction element 48 is actuated by the piston referred to earlier and is slidably mounted on parallel guideways 60 provided at the inner ends of the yoke arms 44, and whilst the guideways 60 are illustrated as being normal to the plane of the disc, they may alternatively be inclined thereto in order to create a servo effect. It will be noted from FIG. 3 that the parts of the backplate 54 which are adjacent the guideways 60 are deformed rearwardly as at 62 to ensure that when the pad 52 is fully worn there is no possibility of the pad 52 becoming displaced from the brake. The indirectly operated friction element 50 is secured to the crown portion of the yoke 42 within the central yoke aperture 46. Radial displacement of both friction elements is avoided and their respective backplates are maintained square to the yoke 42 by means of support plates 64 having axially directed tags 66 keyed to the yoke 42 and flanged edges 68 extending across the top edges of the backplate 54 and 58.

For the purpose of counteracting the turning couple which is produced by the directly operated friction element 48 during a brake application, and which is due to the axial displacement of the front face of the pad 52 from the point of drag take off on the yoke 42, it will be seen in FIG. 3 that the axis of the body member 10 and hence of the piston therein is offset from the central axis of the pad 52. In this way, during a brake application, an opposing couple is set up to balance the effect of the turning couple described.

By providing a caliper which is readily fabricated from a number of components which are then easily and inexpensively assembled, the invention eliminates the need for complicated castings and facilitates manufacture, since two of the components which it employs are metal pressings whilst the third is a casting of much simpler shape than the one-piece castings usual hitherto.

Although the invention has been described with reference to a hydraulic and mechanical actuator arrangement in which operation of the mechanical actuator affects the volume of the hydraulic chamber in which the piston is situated, it will be appreciated that it may just as readily be used in connection with the type of actuator assembly in which the hydraulic and mechanical functions are performed independently of and without affecting one another, for example, arrangements using annular pressure chambers.

I claim:
1. A swinging caliper disc brake comprising, in combination with a brake disc, a pair of friction elements respectively adapted to be displaced into engagement with opposite sides of the disc, a power driven actuator arranged to act on at least one of the pair of elements to effect said displacement and a caliper comprising a body member for the actuator, a separate pivot member secured to the body member for enabling the same to be pivotally mounted about an axis parallel to the plane of the disc and a separate centrally apertured yoke carried by the separate pivot member and forming with the pivot member an assembly including a closed loop for chordally circumscribing the disc and providing a mounting for the pair of elements, said axis also being substantially parallel to the chordal plane of the yoke.

2. A swinging caliper disc brake as set forth in claim 1 wherein the body member is a casting and the pivot member and yoke are metal pressings, the pivot member being generally U-shaped and the yoke C-shaped and the pivot member is bolted to the body casting and has seating surfaces to which the yoke is welded.

3. A swinging caliper disc brake as set forth in claim 2 wherein the yoke is deformed in the region of its two arms to conform with the outline of the disc.

4. A swinging caliper disc brake as set forth in claim 3 wherein the pivot member is secured along the upper edge of its two limbs to the inner end region of the arms of the C-shaped yoke thereby forming the closed loop.

5. A swinging caliper disc brake as set forth in claim 1 wherein one of the friction elements is displaceable directly by the actuator and the other is indirectly displaceable into engagement with the disc by the resulting reaction.

6. A swinging caliper disc brake as set forth in claim 5 wherein the actuator comprises a displaceable member which is arranged to act on the directly operated element and is displaceable selectively by an hydraulic piston and cylinder means and independent mechanically operable means.

7. A swinging caliper disc brake as set forth in claim 5 wherein the actuator comprises an hydraulic cylinder formed in the body member, a piston slideable in the cylinder and a mechanically displaceable plunger which is arranged to act on the rear of the piston, the directly operated friction element being displaceable into engagement with the disc in response to displacement of the piston along the cylinder and the piston being displaceable selectively in response to the admission of pressure fluid into the cylinder and displacement of the plunger respectively.

8. A swinging caliper disc brake as set forth in claim 7 in which the directly operated element is mounted on a backplate and is slidably mounted on parallel guideways on the yoke, those portions of the backplate adjacent the guideways being deformed rearwardly to prevent the element from becoming displaced from the brake even when completely worn.

9. A swinging caliper disc brake as set forth in claim 8 in which the guideways are normal to the plane of the disc.

10. A swinging caliper disc brake as set forth in claim 8 in which axis of the cylinder to the body member and hence of the piston, is offset from the central axis of the directly operated element whereby a couple is set-up during brake application to balance the effect of a turning couple produced by the axial displacement of the front face of the directly operated pad from the point of drag take-off on the yoke.

11. A swinging caliper disc brake as set forth in claim 2 wherein the inner end region of the arms of the C-shaped yoke constitute guides for the friction element displaceable by the actuator.

12. A swinging caliper disc brake as set forth in claim 11 wherein the actuator body member is formed with fixing lugs on opposite sides for locating between the rear internal surface of the U-shaped pivot member and the end regions of the arms of the C-shaped yoke, parallel therewith.

References Cited

UNITED STATES PATENTS

| 2,862,258 | 12/1958 | Burnett | 188—73 |
| 3,166,156 | 1/1965 | Burnett et al. | 188—73 |
| 3,211,261 | 10/1965 | Chouings | 188—73 |

FOREIGN PATENTS

| 1,357,534 | 2/1964 | France. |
| 806,919 | 1/1959 | Great Britain. |
| 938,978 | 10/1963 | Great Britain. |

MILTON BUCHLER, *Primary Examiner.*

G. E. A. HALVOSA, *Assistant Examiner.*